Aug. 9, 1966 R. J. DIEFENDORF 3,265,519
ARTICLE COMPRISING SEVERAL LAYERS OF PYROLYTIC
GRAPHITE AND SUBSTRATE COATED WITH SAID LAYERS
Filed Feb. 1, 1962
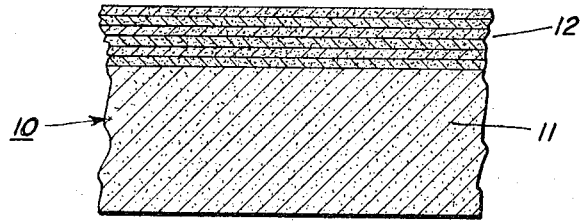
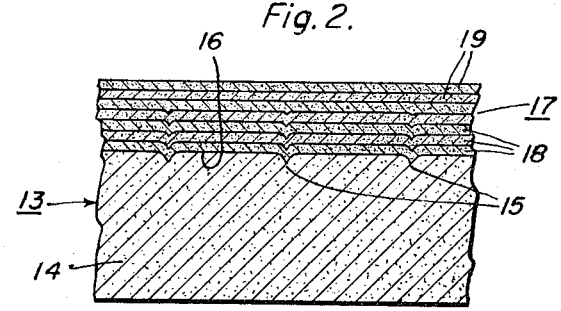
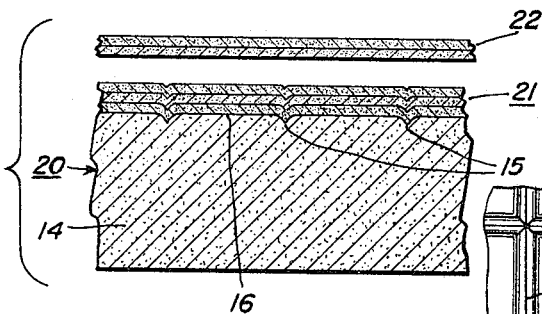
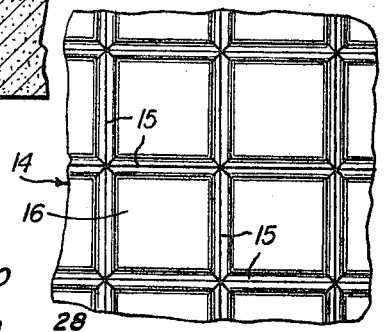
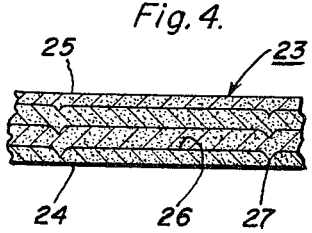
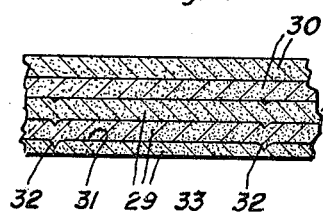
Inventor:
Russell J. Diefendorf,
by Paul R. Webb, II
His Attorney.

United States Patent Office 3,265,519
Patented August 9, 1966

3,265,519
ARTICLE COMPRISING SEVERAL LAYERS OF PYROLYTIC GRAPHITE AND SUBSTRATE COATED WITH SAID LAYERS
Russell J. Diefendorf, Schenectady, N.Y., assignor to General Electric Company, a corporation of New York
Filed Feb. 1, 1962, Ser. No. 170,421
6 Claims. (Cl. 117—8)

This invention relates to composite articles and more particularly to composite articles having a member and a pyrolytic graphite coating thereon.

Pyrolytic graphite is defined as a polycrystalline material made from carbonaceous gases by thermal decomposition or from a carbonaceous material by evaporation and deposition on a surface. In pyrolytic graphite, planar graphite crystallites are arranged so that their layer structures are parallel to the deposition surface. It is useful as a high temperature material for lamp filaments, furnace linings and neutron reactor moderators. Development of missile and space propulsion systems has created an additional requirement for composite pyrolytic graphite components in these systems.

The thermal expansion coefficients of a piece of pyrolytic graphite are measured along the "C" direction and the "A" direction, a direction generally perpendicular to the "C" direction. The "C" direction is defined as the component of the maximum measured number of crystallites in the "c" direction or orientation. The "A" direction is defined as the component of the maximum measured number of crystallites in directions perpendicular to the "c" direction. The expansion coefficient of a pyrolytic graphite coating measured along its "C" direction is in the range of about $10.0 \times 10^{-6}$ to $28.5 \times 10^{-6}$ per centigrade degree. The average expansion coefficient along its "A" direction, an axis generally perpendicular to its "C" direction, is in the range of about $0.8 \times 10^{-6}$ to $3.0 \times 10^{-6}$ per centigrade degree from room temperature to 1000° C.

Carbonaceous gases have been thermally decomposed and deposited on surfaces to produce pyrolytic graphite. As a result of the decomposition, carbon is removed from the gas and deposits on the surface so that planar graphite crystallites are aligned into a layer structure. It is desirable to provide composite pyrolytic graphite articles at high deposition rates in which each article includes a pyrolytic graphite coating bonded tightly to a member. Furthermore, it is advantageous to have a coating which has a similar coefficient of expansion to its member at room temperature. It would appear that only the temperature need be increased in the deposition chamber to produce a corresponding increase in deposition rate. However, in a deposition at a temperature above 1000° C., the pyrolytic graphite coating is applied rapidly but the expansion coefficient of the coating in the plane of deposition or "A" direction is substantially less than the expansion coefficient of the member in the same direction with resulting peeling or popping off of the coating upon cooling the article to room temperature. Thus, a temperature increase does not solve the deposition problem but provides a non-adhering layer which does not produce a composite article.

In my copending patent application Serial No. 92,417, now Patent No. 3,172,774 which was filed on Feb. 28, 1961, there is disclosed and claimed a method of forming a composite article wherein a pyrolytic graphite coating with uniform soot deposits adheres tightly to the member. My present invention is directed to composite articles having a member with an adherent pyrolytic graphite coating thereon which does not require a uniform soot deposit therein.

It is an object of my invention to provide a composite pyrolytic graphite article.

It is another object of my invention to provide a composite pyrolytic graphite article in which the coating has an outer portion with higher anisotropy than its inner portion.

It is another object of my invention to provide a composite pyrolytic graphite article in which a second pyrolytic graphite coating is bonded to a member having a first pyrolytic graphite coating thereon.

It is a further object of my invention to provide a pyrolytic graphite article in which a plurality of depressions on adjacent layers diminish in depth.

It is a still further object of my invention to provide a pyrolytic graphite article in which the outer portion has higher anisotropy.

In carrying out my invention in one form, a composite article comprises a member, said member having a plurality of depressions on at least one surface thereof, a pyrolytic graphite coating on the surface, the coating comprising a first portion adjacent the surface, a second portion adjacent the first portion, and the second portion characterized by higher anisotropy than the first portion.

These and various other objects, features, and advantages of the invention will be better understood from the following description taken in connection with the accompanying drawing in which:

FIGURE 1 is a sectional view of a portion of a composite article including a smooth surface on the member;

FIGURE 2 is a sectional view of a portion of a composite article embodying my invention;

FIGURE 3 is an exploded sectional view of a portion of a modified composite article;

FIGURE 4 is a sectional view of a portion of a pyrolytic graphite article;

FIGURE 5 is a sectional view of a portion of a pyrolytic graphite article including a first portion and a second portion, and FIGURE 6 is a plan elevational view of a graphite member having depressions in the surface thereof.

In FIGURE 1 of the drawing there is shown generally at 10 a composite article which comprises a member 11 with a higher thermal expansion coefficient than pyrolytic graphite in the "A" direction, such as graphite. A pyrolytic graphite coating 12 is shown on member 11. The planar graphite crystallites are arranged by deposition so that their layer structures are parallel to the deposition surface of member 11. If coating 12 is deposited on member 11 at a temperature above 1000° C., coating 12 is applied rapidly but the expansion coefficient of the coating in the plane of deposition or "A" direction is substantially less than the expansion coefficient of member 11 in the same direction. Upon cooling to room temperature, coating 12 will peel or pop off of member 11. In my above-mentioned co-pending application Serial No. 92,417 a method of forming a composite article is disclosed and claimed wherein a pyrolytic graphite coating 12 with uniform soot deposits is deposited on member 11 and adheres tightly thereto.

In FIGURE 2 of the drawing a composite article is shown generally at 13 which comprises a member 14 similar to member 11 in FIGURE 1 with a plurality of depressions 15 on at least one surface 16 thereof. A pyrolytic graphite coating 17 adheres tightly to member 14. Coating 17 comprises a first portion 18 adjacent surface 16 of member 14 and a second portion 19 adjacent first portion 18. First portion 18 has a plurality of generally parallel layers. The first of the layers adjacent surface 16 follows the contour of depressions 15 in surface 16. The depth of the depressions is diminished in each successive layer in portion 18. First portion 18 with its depressions provides an increased thermal expansion coefficient in the "A" direction of the pyrolytic graphite therein improving the joint between this portion and portion 19 of pyrolytic graphite coating 17. Depressions 15 in surface 16 are created by roughening the surface of member 14 in various manners. For example, I have found that it is preferable to provide criss-crossed grooves for depressions 15. Second portion 19 has a plurality of generally parallel layers adjacent first portion 18. Second portion 19 is characterized by higher anisotropy than first portion 18.

In FIGURE 3 of the drawing, a composite article is shown generally at 20 in an exploded view which includes a member 14 with a plurality of depressions 15 on at least one surface 16 thereof. A first coating 21 of pyrolytic graphite has a plurality of generally parallel layers. The first of these layers adjacent surface 16 follows the contour of depressions 15 in surface 16 to adhere tightly to member 14. The depth of the depressions is diminished in each successive layer of coating 21. This coating with its depressions provided an increased thermal expansion coefficient in its "A" direction. A second coating 22 of pyrolytic graphite, which has a plurality of generally parallel layers, is bonded to first coating 21 in any suitable manner, such as by brazing. Second coating 22 is characterized by higher anisotropy than first coating 21.

The composite article 13 which is shown in FIGURE 2 of the drawing is produced, for example, by the method and apparatus disclosed and claimed in my co-pending application Serial No. 119,538, now Patent No. 3,138,435 filed June 26, 1961, and assigned to the same assignee as the present application. In this method, a plurality of members 14, each of which is provided with depressions 15 in the form of criss-crossed grooves on at least one surface 16 thereof, are positioned within an enclosure and spaced therefrom to provide a narrow passage between the members and the enclosure. A narrow passage is also provided between each pair of adjacent members. The passages are evacuated and a carbon vapor is flowed at a temperature in the range of 2000° C. to 2500° C. through the passages. In this manner, a pyrolytic graphite coating is formed on surface 16 of members 14. While one surface of member 14 is provided with depressions and coated with pyrolytic graphite, both surfaces of member 14 can be provided with depressions and coated with pyrolytic graphite.

As it was mentioned above, the depressions 15 on surface 16 of member 14 allow the layers of first portion 18 of pyrolytic graphite coating 17 to follow the contour of this surface. Second portion 19 of coating 17 is provided with a parallel layer structure adhering tightly to first portion 18. Thus, this composite article is produced at a higher deposition rate since a higher temperature range can be employed. However, a free standing body is not produced as provided for in the above-identified copending application but rather a tightly adhering coating of pyrolytic graphite is produced on member 14 because of depressions 15 in surface 16.

Composite article 20 which is shown in FIGURE 3 of the drawing is provided with a first coating 21 of pyrolytic graphite by deposition thereof on member 14 in accordance with the method and apparatus set forth in above co-pending application Serial No. 119,538 now Patent No. 3,138,435. A coating 22 of pyrolytic graphite which is produced in accordance with the subject co-pending application is bonded subsequently to first coating 21 in any suitable manner such as by brazing. In this manner, a composite article is produced which has a member with a plurality of depressions on at least one surface thereof, a first pyrolytic graphite coating adhering tightly to the member, and a second coating of pyrolytic graphite bonded to the first coating.

In FIGURE 4 of the drawing, an article is shown which comprises a plurality of generally parallel pyrolytic graphite layers 23. The opposite exterior surfaces 24 and 25 of the article are preferably smooth. Interior surface 26 of the exterior layer with exterior surface 24 has a plurality of depressions 27 therein. Each of the successive layers has a plurality of depressions which diminish in depth. This article, which is similar to coating 21 in FIGURE 3 of the drawing, has opposite smooth surfaces 24 and 25. Such an article is useful to provide a seal between a member, such as tungsten, and a pyrolytic graphite coating.

In FIGURE 5 of the drawing an article is shown comprising a plurality of generally parallel pyrolytic graphite layers 28. These layers include a first portion 29 and a second portion 30. The interior surface 31 of the exterior layer in first portion 29 has a plurality of depressions 32 therein. The exterior surface of this exterior layer is smooth such as at 33. Each of the successive layers 28 in the first portion has depressions therein diminishing in depth. Second portion 30 has a plurality of generally parallel layers adjacent the first portion. This second portion is characterized by higher anisotropy than the first portion.

The article which is shown in FIGURE 4 of the drawing is produced in the same manner as coating 21 in FIGURE 3. After pyrolytic graphite material has been formed on a graphite member such as member 14 in FIGURE 3, the article is formed by removing the material from the member and machining the opposite exterior surfaces to smoothness. While depressions 27 could be retained in the exterior surfaces, it is preferable to smooth these surfaces for subsequent bonding to a member, such as tungsten, and a pyrolytic graphite coating respectively. In such a resulting structure with a tungsten member, article, and pyrolytic graphite coating, the article provides an increased thermal expansion coefficient in the "A" direction thereby improving the joint between the tungsten member and the pyrolytic graphite coating. It is difficult to provide surface depressions such as criss-crossed grooves on the tungsten member and deposit the pyrolytic graphite article of FIGURE 4 thereon. It is preferable to form this article on a graphite member with depressions such as shown in FIGURE 3 of the drawing. The article is subsequently removed from the graphite member and its surfaces are smoothed.

The article which is shown in FIGURE 5 of the drawing is produced in the same manner as coating 17 in FIGURE 2 of the drawing. After the pyrolytic graphite material has been formed on a graphite member, it is removed and its surface adjacent the member is machined to smoothness. This article can be subsequently used, for example, for joining to a tungsten member to provide a composite article.

In FIGURE 6 of the drawing, a graphite member 14 is shown with depressions 15 in upper surface 16 thereof. These depressions 15 are shown in the form of criss-crossed grooves.

While other modifications of this invention and variations of method which may be employed within the scope of the invention have not been described, the invention is intended to include such that may be embraced within the following claims.

What I claim as new and desire to secure by Letters Patent of the United States is:

1. A composite article comprising a member, said member having a plurality of depressions on at least one surface thereof, a pyrolytic graphite coating on said surface, said coating comprising a first portion adjacent said surface, a second portion adjacent said first portion, and said second portion characterized by higher anisotropy than said first portion.

2. A composite article comprising a member, said member having a plurality of depressions on at least one surface thereof, a pyrolytic graphite coating on said surface, said coating comprising a first portion and a second portion, said first portion comprising a plurality of generally parallel layers, the first of said layers adjacent said surface following the contour of the depressions in said surface, each of the successive layers having depressions diminishing in depth, said second portion adjacent said first portion, said second portion comprising a plurality of generally parallel layers, and said second portion characterized by higher anisotropy than said first portion.

3. A composite article comprising a member, said member having a plurality of depressions on at least one surface thereof, a first pyrolytic graphite coating adjacent said surface, a second pyrolytic graphite coating adjacent said first coating, and said second coating characterized by higher anisotropy than said first coating.

4. A composite article comprising a member, said members having a plurality of depressions on at least one surface thereof, a first pyrolytic graphite coating adjacent said surface, said coating comprising a plurality of generally parallel layers, the first of said layers adjacent said surface following the contour of the depressions in said surface, each of the successive layers having depressions diminishing in depth, a second pyrolytic graphite coating bonded to said first coating, said second coating comprising a plurality of generally parallel layers, and said second coating characterized by higher anisotropy than said first coating.

5. An article comprising a plurality of generally parallel pyrolytic graphite layers, the interior surface of one of the exterior layers having a plurality of depressions therein, and each of the successive layers having depressions therein diminishing in depth.

6. An article comprising a plurality of generally parallel pyrolytic graphite layers, said layers comprising a first portion and a second portion, the interior surface of the exterior layer in said first portion having a plurality of depressions therein, each of the successive layers in said first portion having depressions therein diminishing in depth, and said second portion characterized by higher anisotropy than said first portion.

References Cited by the Examiner

UNITED STATES PATENTS

| | | | |
|---|---|---|---|
| 2,615,270 | 10/1952 | Adler | 117—29 X |
| 3,074,817 | 1/1963 | Gentner. | |
| 3,107,180 | 10/1963 | Diefendorf. | |

ALFRED L. LEAVITT, *Primary Examiner.*

RICHARD D. NEVIUS, JOSEPH B. SPENCER,
*Examiners.*

R. E. ZIMMERMAN, A. H. ROSENSTEIN,
*Assistant Examiners.*